Aug. 5, 1958
J. A. BUVELOT
2,846,032
BRAKE RIGGING ALIGNING MEANS
Filed Oct. 26, 1956
2 Sheets-Sheet 1
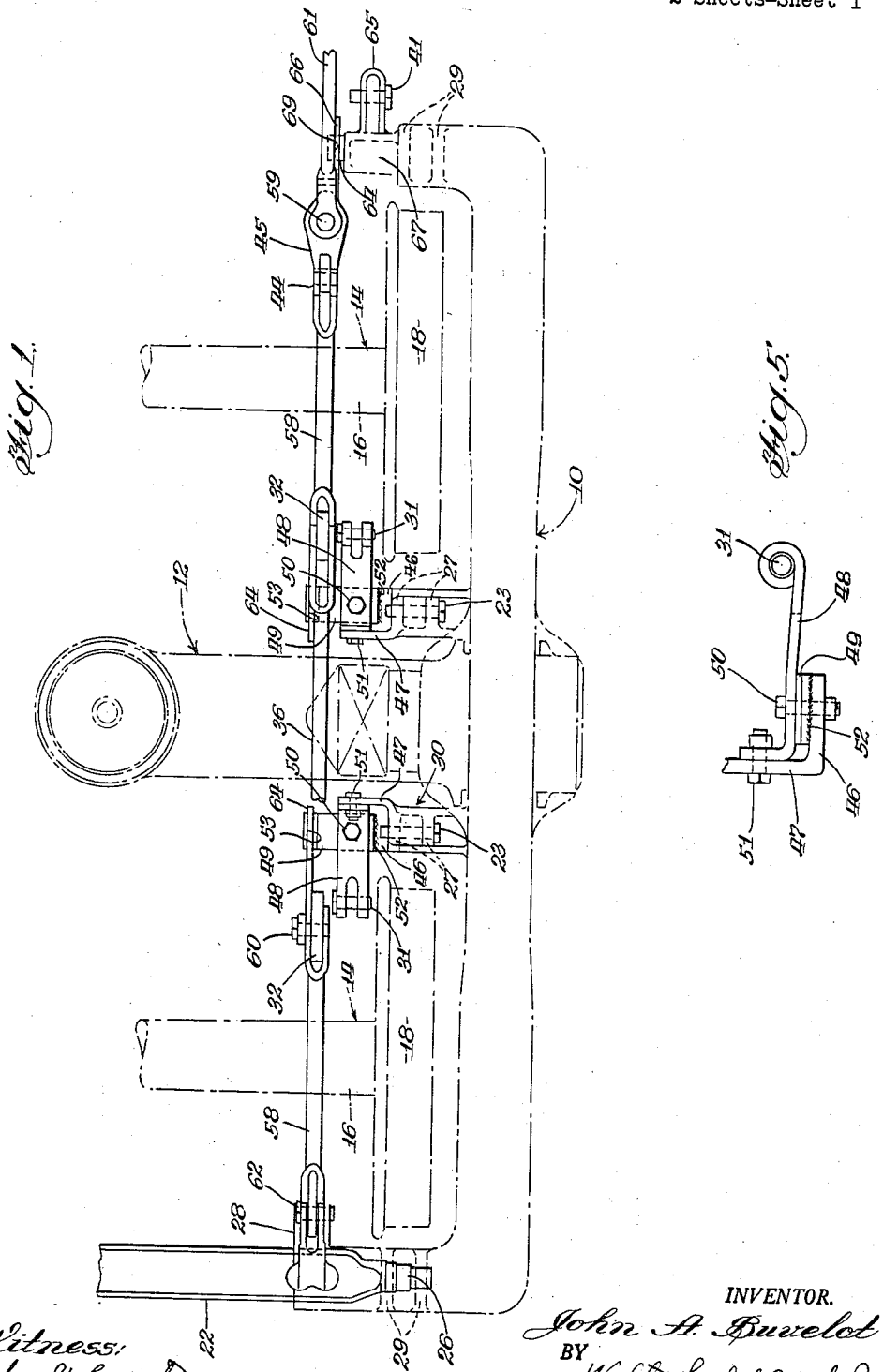
INVENTOR.
John A. Buvelot
BY Walter J. Schlegel, Jr.
Atty.
Witness:
Richard W. Carpenter Aug. 5, 1958
J. A. BUVELOT
2,846,032
BRAKE RIGGING ALIGNING MEANS
Filed Oct. 26, 1956
2 Sheets-Sheet 2
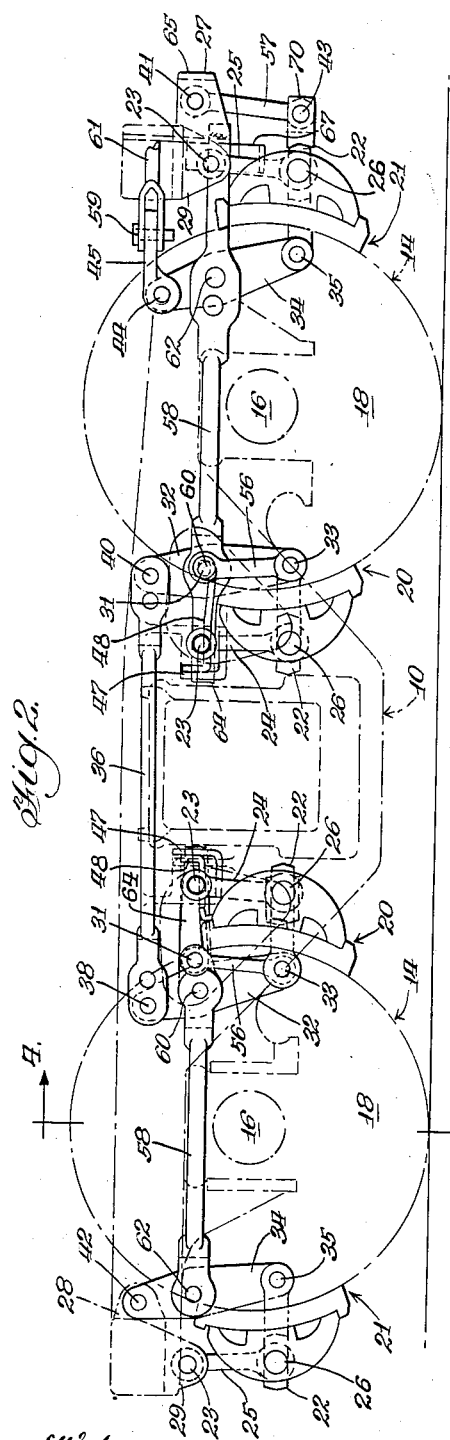
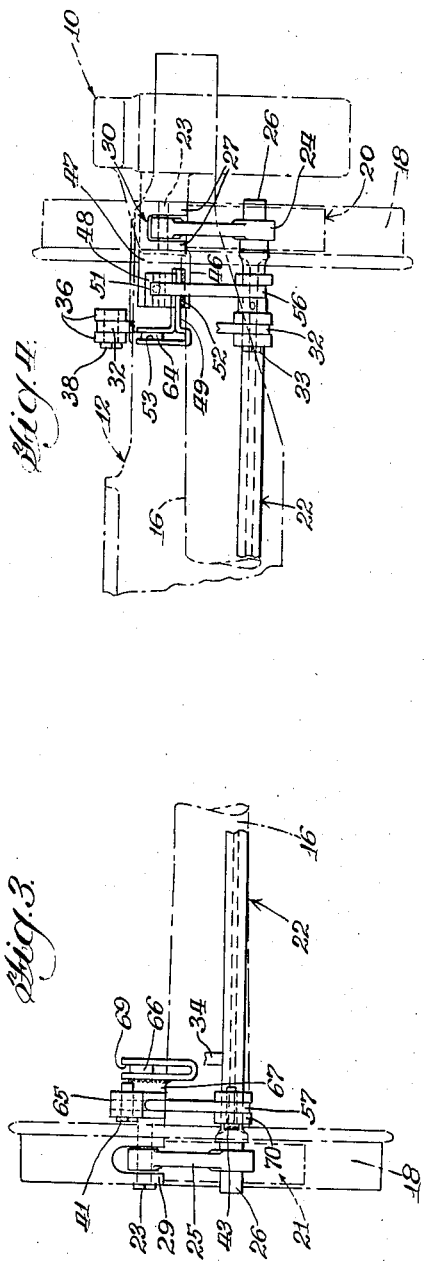
INVENTOR.
John A. Buvelot
BY Walter L. Schlegel, Jr.
Atty.
Witness:
Richard W. Carpenter

United States Patent Office 2,846,032
Patented Aug. 5, 1958

2,846,032

BRAKE RIGGING ALIGNING MEANS

John A. Buvelot, Chicago, Ill., assignor to American Steel Foundries, Chicago, Ill., a corporation of New Jersey Application October 26, 1956, Serial No. 618,544

1 Claim. (Cl. 188—205)

This invention relates to brake arrangements and more particularly to a clasp brake arrangement for a railway car truck.

The invention comprehends a brake linkage system including novel guide means to maintain the brake levers in a common plane and in substantial alignment with each other.

In the normal course of operations braking equipment, and particularly the brake linkage, is continually being subjected to jolts and shocks resulting in misalignment of the braking elements and reducing the efficiency of the brake system as well as causing parts to wear rapidly and unevenly.

Although the general idea of providing guide means for elements of brake linkage is not new, the conventional linkage guide arrangements employed in the past have been of the type disclosed in U. S. Patent No. 2,002,930, which merely consists of a bracket having a slot in which a connecting rod can ride.

This type of guide arrangement can only serve to prevent the movement of the particular element guided, e. g., the connecting rod slidably disposed in the guide slot, in a direction inboardly or outboardly of the truck. However, as most connecting rods are round in section, they are not restrained by the conventional guide means from rotating about their longitudinal axes. Thus, if the rod is free to rotate about its longitudinal axis the angle of the levers connected to opposite ends of the rod are free to angle relative to the vertical and their position relative to other portions of the linkage can always change.

It is therefore a primary object of this invention to provide an efficient and improved brake rigging of relatively simple design and construction which includes improved linkage aligning means.

Another object of the invention is the provision of a brake linkage arrangement which includes a means of maintaining the brake levers aligned with each other and in at common vertical plane.

A more specific object of the invention is to provide a brake linkage arrangement wherein brake lever connecting rods are provided with guide means adapted to engage guide means on the frame to restrict the rotation of the rods about their longitudinal axis and thereby prevent the levers connected to the rods from angling relative to the vertical.

These and other objects of the invention will be apparent from an examination of the following description and drawings, wherein:

Figure 1 is a fragmentary top plan view of a portion of a railway car truck to which has been applied a brake rigging embodying features of my invention;

Figure 2 is a fragmentary side elevational view of the structure illustrated in Figure 1;

Figure 3 is a fragmentary end elevational view of the structure illustrated in Figure 2, as seen from the right;

Figure 4 is a fragmentary elevational view taken on line 4—4 of Figure 2, and

Figure 5 is a fragmentary view illustrating certain elements of a side frame mounting bracket.

It will be understood that certain elements have been intentionally omitted from certain views where they are more clearly shown in other views.

Referring now to the drawing for a better understanding of the invention, it will be seen that the device is shown as applied to a brake rigging for a railway freight car truck comprising a pair of spaced side frames 10 interconnected by a bolster 12 and supported in the conventional manner by a pair of spaced wheel and axle assemblies 14, each comprising an axle 16 and a pair of wheels 18 (only one of which is shown). The bolster is spring-supported in the uusal manner (not shown) by the frames 10.

The brake means for each assembly preferably comprises a pair of inner and outer brake shoe assemblies 20 and 21, respectively (only one assembly of each pair being shown), disposed on opposite sides and engageable with the related wheel 18. The assemblies of each pair disposed on corresponding sides of and associated with each assembly may be mounted on and connected to each other by a transversely extending beam 22. The beams 22 may be supported at their ends from the truck frame by inner and outer brake hangers 24 and 25, respectively, which have their lower ends journally receiving trunnion portions 26 of the beams.

The upper ends of the inner brake hangers 24 may be pivotally connected by pins 23 to lugs 27 depending from integral side frame brackets 30, Figure 5, and the upper ends of the outer brake hangers 25 may be pivotally connected by pins 23 to side frame lugs 29.

Actuation of the brake shoe assemblies is achieved by generally vertical inner and outer brake levers 32 and 34 which may be pivotally connected at their lower ends by pins 33 and 35, respectively, to the brake shoe assemblies 20 and 21 disposed on and engageable with the inner and outer sides, respectively, of the wheel and axle assemblies.

The inner brake levers 32, as best seen in Figure 2 of the drawing, are live or floating brake levers interconnected at their upper extremities by a pull rod 36 pivotally connected to the left and right inner levers 32 by pins 38 and 40, respectively. The outer brake lever 34 associated with the left hand wheel 18 is a dead lever fulcrumed at its upper end by pin 42 to a pair of side frame lugs 28, while the outer lever 34, associated with the right hand wheel 18, is a live lever having its upper extremity pivotally connected by pin 44 to a link 45 which in turn is connected by pin 59 to a lever or rod 61 actuated by a power source (not shown). In order to maintain the brake shoe assemblies associated with the live brake levers in proper vertical alignment, inner and outer balance hangers 56 and 57, respectively, may be provided in a manner hereafter described.

As best seen in Figures 1 and 5, the side frame is provided with brackets 30 which may be formed as an integral part of or rigidly secured to the side frame and may each comprise, in addition to the before mentioned brake hanger lugs 27, inboardly extending horizontal and vertical walls 46 and 47 to which are secured a balance hanger arm 48 and a guide arm 49 by nut and bolt assemblies 50 and 51. The guide arm 49 may also be rigidly secured to the horizontal wall 46, as by weld 52, and presents at its inboard extremity a generally rectangular guide slot 53.

The end of the side frame adjacent the live outer brake lever 34 may also be provided with an outwardly extending balance hanger bracket 65 and an inboardly extending guide arm 67 presenting at its inboard extremity a generally rectangular guide slot 69.

The inner balance hangers 56 may be pivotally connected at their upper and lower ends by pins 31 and 33 to the balance hanger arms 48 and brake shoe assemblies 20, respectively, while the single outer balance hanger 57 may be pivotally connected at its upper and lower ends by pins 41 and 43 to side frame bracket 65 and brake shoe assembly 21; respectively.

The inner and outer brake levers associated with each wheel may be interconnected by generally horizontally extending pull or connecting rod 58, pivotally connected at its inner and outer ends to the levers by pins 60 and 62, respectively.

In order to maintain proper alignment of the linkage, the rods 58 are provided at their ends with preferably integrally formed outwardly extending inner and outer flat, vertical guide bars or guide rod portions 64 and 66, respectively. The guide portions 64 and 66 are slidably received in the rectangular slots 53 and 69, presented by inner and outer guide arms 49 and 67, respectively.

As best seen in Figures 3 and 4, because the guide extensions 66 and 64 are substantially rectangular in cross section, their relatively snug sliding engagement with the inner surfaces of slots 69 and 53, respectively, serves to prevent rotation of the rods about their longitudinal axes as well as prevent their movement in directions inboardly or outboardly of the truck. Consequently, as the rotation of the rods is restricted, their related brake levers are prevented from angling relative to the vertical and they are thus maintained in alignment with each other and in a common rotative plane to ensure smooth, even, uniform movement of all the brake linkage elements at all times.

I claim:

In a clasp brake arrangement for a railway car truck including at least one wheel and axle assembly and a frame supported thereby, the combination of: friction means; power means; linkage means connecting the friction means to the power means for the actuation of the former by the latter, said linkage means including a pair of generally vertically extending brake levers at least one of which is a live lever with a floating fulcrum point, said levers being interconnected by a floating generally horizontally extending connecting rod; and aligning means operable to prevent rotation of the rod about its longitudinal axis and prevent lateral movement of the rod transversely of the truck, and thereby maintain said live brake lever in alignment with the other brake lever in a common vertical plane the location of which is fixed with respect to the longitudinal center plane of the truck, said aligning means comprising at least one elongated element rectangular in section extending from an end of said connecting rod and received in snug slidable engagement within a complementary U-shaped rectangular slot presented by the frame.

References Cited in the file of this patent

UNITED STATES PATENTS

| | | |
|---|---|---|
| 1,322,048 | Peyeke | Nov. 18, 1919 |
| 1,791,621 | Hindshl | Feb. 10, 1931 |
| 2,088,142 | Stertzbach | July 27, 1937 |
| 2,512,686 | Simanek | June 27, 1950 |